Patented Oct. 16, 1934

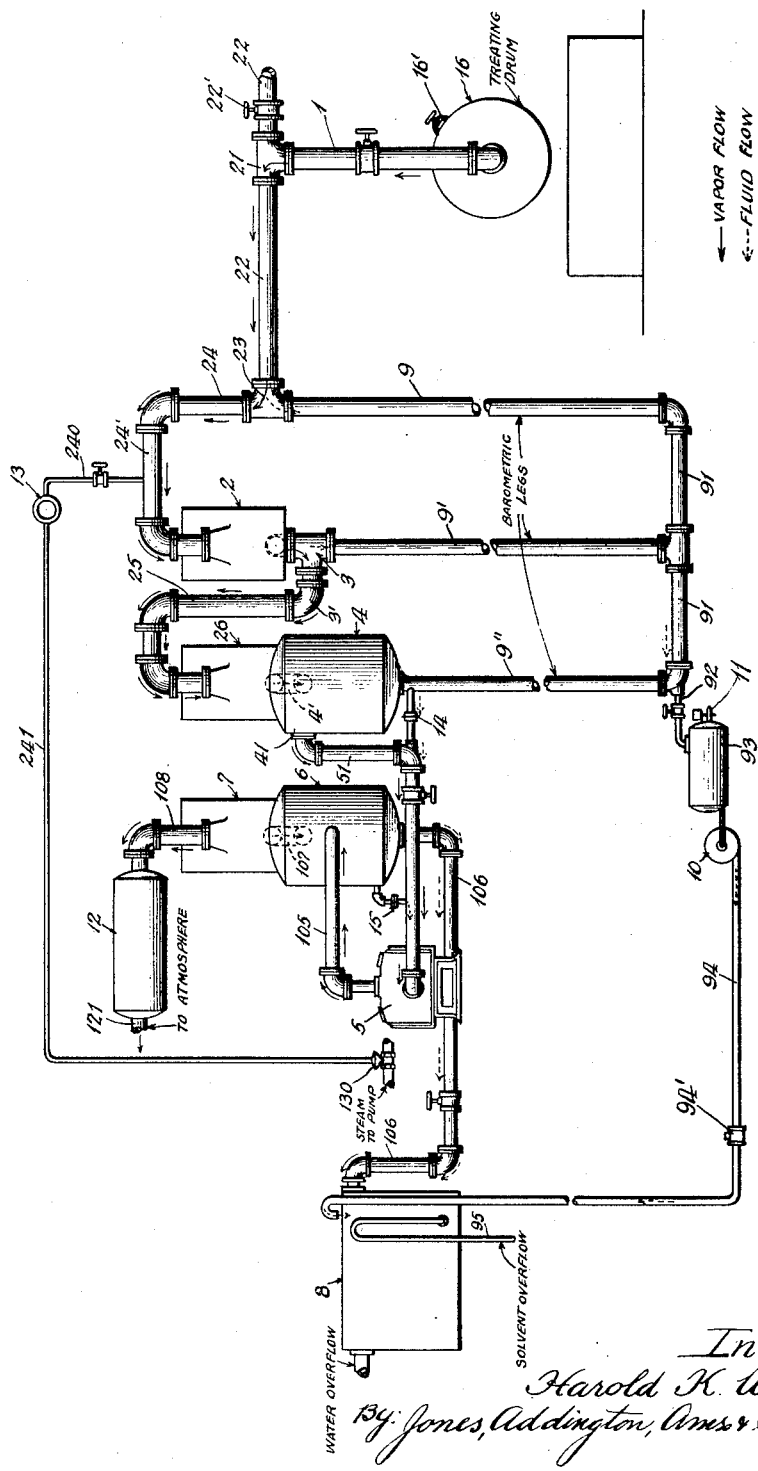

1,977,416

UNITED STATES PATENT OFFICE 1,977,416

PROCESS OF DECAFFEINATING COFFEE BEANS

Harold K. Wilder, Battle Creek, Mich., assignor to Kellogg Company, Battle Creek, Mich., a corporation of Delaware Application February 4, 1932, Serial No. 590,873

10 Claims. (Cl. 99—11)

The present invention relates to an improvement in the process for the decaffeination of unroasted coffee beans. It also relates to an apparatus which may be employed in carrying out such process.

One of the objects of the invention is to produce a decaffeinated coffee product which yields a beverage practically indistinguishable from that made from non-decaffeinated coffee beans.

Another object of the invention is the removal of the caffeine from coffee beans, preferably opened up by treatment with steam and/or water in very finely divided condition, by the use of a suitable solvent; followed by the removal of said solvent by means of water vapor.

Another object of the invention is to remove the caffeine from coffee beans by means of a suitable solvent, such, for example, as trichloroethylene, without in any way injuring the flavor and quality of the coffee beans undergoing treatment.

A further object of the invention is to treat green coffee beans by means of heat, such, for example, as water vapor at a temperature of about 200° F., so as to destroy substances contained in green coffee beans which in the presence of moisture and at a moderate heat are capable of developing an undesirable or "off" flavor, by which is meant such substances, for example, as enzymes, ferments, microbiological organisms and other similarly functioning organic catalysts and flavor-altering components; followed by treatment with steam, or water in a fine state of subdivision, so as to cause the coffee beans to absorb the water uniformly and gradually without at any time actually becoming sufficiently wet to cause substantial solution of the soluble constituents of the coffee beans; whereupon the coffee beans thus preliminarily treated are subjected to the action of trichloroethylene, or an equivalent solvent, which latter is subsequently removed by drainage; followed by the entire removal of the residual solvent remaining in the beans by subjecting them while in a state of continual but mild agitation to the effects of a stream of water vapor at a temperature substantially below the normal boiling point of water, or 212° F.

A further object of the invention is to provide a process of decaffeinating green coffee beans which comprises the steps of treating the same for a short period of time with water vapor at a temperature sufficiently high to prevent the subsequent development, during the following steps, of an undesirable or "off" flavor which is attributable to the action of substances contained in green coffee beans which are in the nature of enzymes, ferments, microbiological organisms and other similarly functioning organic catalysts and flavor-altering components, followed by submission of the thus treated coffee beans to water vapor or a spray or fine mist of warm water in amounts sufficient to dampen the beans but insufficient to dissolve any substantial amount of solubles therefrom, thereupon subjecting the thus moistened beans to extraction with a chlorinated hydrocarbon capable of dissolving the caffeine from said beans, withdrawing the bulk of said solvent and removing the balance of the latter by subjecting the coffee beans under reduced pressure to the action of water vapor at a temperature preferably not substantially in excess of 170° F. until the said solvent has been substantially completely removed from the coffee beans, and thereupon drying the same with dry warm air, the entire operation being carried out in the same apparatus under continual, but mild, agitation.

A further object of the invention is to provide decaffeinated coffee beans which have substantially all of the flavor and quality of non-decaffeinated coffee beans and which hence are much more satisfactory than decaffeinated coffee beans made by prior art processes, and are in fact practically indistinguishable from natural coffee beans, except for the absence of the caffeine. The beverage produced from the subsequently roasted coffee beans is also entirely devoid of the sweetish taste and aroma characteristic of burnt sugar or caramel.

A further object of the invention is to provide an apparatus which may be employed for the treatment of coffee beans in accordance with the present invention, the said apparatus comprising substantially the combination of a rotating drum containing the coffee beans, means for injecting finely divided water, steam, air, and solvent into said drum; means for rotating the drum; and means for producing within said drum a controlled vacuum or partial vacuum, together with aspirating and condensing means so as to recover the solvent volatilized during the later stages of the process, to separate the solvent from the simultaneously condensed water and to render the solvent available for subsequent operations of like character.

A further object of the invention is to provide an apparatus for the treatment of green coffee beans, comprising the combination of condensers and a therewith associated vacuum pump, the said condensers being provided with barometric legs which permit the recovery of a considerable quantity of the condensed solvent without the necessity of passing the same through the vacuum pump, the said apparatus being moreover provided with means for condensing any vapors after they have passed the vacuum pump and therefore are at atmospheric pressure or higher.

The hereunto appended drawing, consisting of one figure, is a diagrammatic representation of suitable equipment which may be employed in carrying out the process as described hereinbelow.

The following is a description of the preferred method of procedure in carrying out the invention:

A. Preliminary treatment

The green coffee beans, having a natural moisture content of 8 to 14%, are placed in a horizontal drum and the drum is caused to rotate. The drum is connected to a suitable vacuum pump, a condenser being preferably interposed between the two units to avoid the necessity of passing all vapors through the pump before condensation. The coffee beans are heat-treated in the rotating drum under reduced pressure at about 200° F. for a period of two hours in order to destroy those substances contained in green coffee beans which, unless destroyed by heat, are capable, in the presence of moisture and at a moderate temperature such as is used subsequently in the process, of developing an undesirable "off" flavor in the coffee. This preliminary short heat-treatment at about 200° F. has been found to be a preventive for the development of an undesirable flavor in the coffee beans, which would subsequently be developed were they merely treated at temperatures between 150° and 170° F. In other words, the problem was on the one hand to prevent the development of the sweetish caramel-like flavor induced by treatment at too high a temperature while on the other hand avoiding the formation of an undesirable "off" flavor by the use of too low a temperature.

Steam and water are then admitted through valves into a mixing pipe where the water is heated, and the steam, if superheated, through expansion is reduced to approximately its boiling point under the conditions of the reduced pressure prevailing in the drum. The mixture of steam and water, which now is water vapor which may also contain a mist of water particles in suspension, enters the drum and causes a warming and moistening of the coffee beans. It is also entirely within the scope of the present invention to employ a cold or warm water spray or mist for this purpose. The principal object to be attained at this point is to increase the moisture content of the coffee beans without excessively heating them. That is to say, as the moisture content of the beans increases, the temperature is reduced, as it has been found that the tendency of the beans to change with the production of the caramel-like flavor increases with their moisture content. This water-vapor or water-spray treatment is continued until the moisture content of the coffee beans is raised to about 16 to 20%. The coffee beans at this point retain their original color except in so far as it may be modified because of the greater moisture content. The addition of moisture is so gradual that there is never formed any substantial amount of a solution of the water-soluble matter contained in the beans.

As an alternative, the first stage of this preliminary treatment may consist of a short high-temperature treatment of the beans to, say, 350° F., provided they are not too moist (from 8–14% moisture), to destroy the enzymes and other already enumerated substances therein; provided that the heating means is such as not to increase the initial moisture content appreciably, and, preferably, to reduce it.

B. Extraction of caffeine by means of a solvent

After cutting off the supply of water vapor and/or water to the drum, the vacuum is released and a solvent, preferably trichloroethylene, is admitted, being warmed previously outside of the drum. It is preferred to operate at the lowest temperature at which substantially complete caffeine removal may be attained, preferably below 160° F. A constant circulation of new warm solvent through the drum is maintained. The extraction is continued for 24 to 40 hours to remove practically all of the caffeine. The drum is then stopped and the solvent withdrawn as completely as possible.

C. Removal of the solvent

After the free solvent has been withdrawn by draining, the drum is again rotated and subjected to a partial vacuum which is formed within the drum by means of a vacuum pump and equipment associated therewith, as will be described more in detail hereinbelow. While thus rotating, and under a reduced pressure corresponding to, say, from 15 to 25 inches of mercury-column, steam is admitted to the drum containing the decaffeinated coffee beans. By reason of the lowered pressure within the drum, this steam will expand and will therefore have a lower temperature than it would have if this expansion were not allowed to take place. The maximum temperature under these conditions is about 150° to 170° F., preferably the latter, but not above it; for, as already mentioned, heating coffee beans in the presence of moisture to above that temperature is very prone to develop the undesired caramel-like taste and change the color of the coffee beans from greenish yellow to brown. The flow of steam penetrates the coffee beans and carries along with it the trichloroethylene, which is very volatile with water vapor and is therefore carried forward and out of the drum and into the condensers which are interposed between the outlet of the drum and the pump that produces the vacuum. The admission of steam, rotation of the drum, and operation of the vacuum pump are continued for 20 to 40 hours, or until no further solvent is detectable in the coffee or in the water vapor escaping from the drum. At this point the connection to the vacuum system is cut off and the vacuum broken by opening suitable valves whereby the interior of the drum is brought to atmospheric pressure.

D. Drying the decaffeinated coffee beans

The drum containing the solvent-free decaffeinated coffee beans is then connected with suitable means for admitting hot air which at the start may have a temperature of from 212° to 240° F. As at this period the coffee beans have a water content of from 25% to 35%, this relatively high temperature of the air will do no harm, as it will be immediately lowered by taking up moisture from the beans, the latter being cooled by virtue of the absorption of heat incident to the evaporation of their contained moisture; but, as the drying proceeds, the temperature of the air being admitted should be lowered so that near the end of the operation it will not be substantially above 212° F. The actual temperature attained by the beans, under the above conditions, will not be substantially above 160° F.

The drum is continually rotated while warm dry air is admitted to the drum, this operation being continued from about 6 to 10 hours, or until the moisture content of the coffee beans has thereby been reduced to that of natural green coffee beans or to about from 8 to 14%. The drum is then stopped, the cover of the opening removed and the drum then turned so as to allow the coffee beans to run out of it and into suitable hoppers, whence they flow into bins for storage and tempering so as to bring about a uniform moisture content preparatory to the ordinary roasting.

One of the characteristic properties of coffee beans produced by the above process is that they retain substantially their original color, which ranges from a pale olive green to a pale greenish yellow; while coffee beans decaffeinated by the prior art processes are characterized by a very noticeable brownish color. This makes it possible to distinguish the product of this process from that yielded by other processes. The odor of the beans as made by the present process is substantially that of fresh green coffee beans, whereas decaffeinated green coffee beans as made in the past had a decided caramel-like aroma and taste.

While the temperatures and duration of treatment have been given specifically hereinabove, it is to be distinctly understood that reasonable variations may be made both in the temperature and the length of time, depending somewhat upon the origin and nature of the green coffee beans, the essential features of the present invention as far as they relate to the process hereinabove disclosed being the preliminary treatment of the coffee beans at a temperature sufficiently high to destroy any substances therein contained which are capable of developing a disagreeable or "off" flavor in the presence of moisture, followed by treatment with water vapor or a mist of water so as to cause a suitable absorption of moisture at a temperature low enough to prevent the development of the caramel-like flavor hereinabove mentioned, the same low temperature being a feature of the solvent-removal stage of the process. The range of temperatures at which the preliminary treatment, except for the first enzyme-destroying heating, is carried out, lies between 140° F. and the boiling point of water at normal pressure. What it is particularly intended to avoid are temperatures in the neighborhood of the normal boiling point of water so long as a substantial amount of moisture is present in the beans, that is to say, above about 14%.

No changes are made in the roasting operations, which are those of the prior art and with which the present invention has no concern.

For a suitable apparatus which may be employed in carrying out the method of the present invention, reference is directed to the herewith presented drawing which is a diagrammatic representation of the vacuum-producing and solvent-condensing equipment employed in connection with the treating drum. In the said drawing, the flow of vapors is shown by solid arrows and the flow of liquid by means of dotted arrows.

The equipment consists essentially of a rotating drum 16 represented diagrammatically and shown in end view at the right-hand side of the drawing. The treatment of the coffee to decaffeinate it takes place in this drum. This drum has a charging door or manhole 16'. Connected at the center line of rotation of the said drum 16 is a vapor line 1 which leads by means of a suitable T 21 into a main vapor line 22 which leads into a T 23. Attached to the T 23 and extending upwardly and downwardly, respectively, are a vapor line 24 and a barometric leg 9 which is shown broken off and is long enough so that, despite the existence of the vacuum, liquid may collect therein without rising to a height greater than the lower flange of the T 23. The vapor line 24 carries the vapors through a continuation 24' thereof and directly into the upper part of a condenser 2, which latter is provided with a similar barometric leg 9' by means of a T or vapor separator 3 whose side opening is connected by means of an L 3' to an upwardly rising vapor line 25 which enters the upper portion of a second condenser 26. The said condenser 26 is in immediate connection with a receiving chamber 4 and is connected therewith by means of a pipe 4', the said chamber 4 being also provided with a barometric leg 9" and having a side outlet 41 which is connected with a vapor line 51 that leads to a vacuum-pump 5.

The barometric legs 9, 9' and 9" all lead into a common main 91 which is connected by means of a small pipe 92 with a receiving vessel 93 which latter is provided with a suitable automatic float switch 11, whereby liquid may be drawn from the tank 93 by means of pump 10 without breaking the vacuum. This liquid consists of a layer of trichloroethylene under water, and is pumped by means of a rotary pump 10 through a transfer line 94 into a separation tank 8, in which the trichloroethylene and water will separate and stratify, the trichloroethylene, being heavier than water, settling to the bottom and being withdrawn from the said tank by an overflow siphon 95. The line 94 is provided with a check-valve 94' to prevent the breaking of the vacuum in the system.

The vacuum-pump 5 is provided on its discharge side with a pipe 105 which leads into a vapor chamber 6. By reason of the increased pressure existing in the vapor chamber 6, namely, atmospheric pressure or higher, an additional quantity of solvent will condense and find its way under the influence of gravity through a pipe 106, into the aforesaid separation tank 8. Any vapors, either of water or trichloroethylene, still remaining uncondensed rise through pipe 107, into a condenser 7 where further condensation takes place, and thence through a pipe 108 into a tank 12 which may contain such solvent-retaining material as, for example, silica-gel, activated charcoal, and other means for adsorbing and absorbing entrained recoverable solvent vapors. From the said drum 12 a pipe 121 leads to the atmosphere. Suitable control valves are shown in the various pipe lines. Suitable orifices 14 and 15 to balance the system are provided as shown.

Connected with the highest point of the vapor transfer line 24' there is a small pipe line 240 which passes to an automatic regulating device 13 which, in turn, is connected by means of an air-line 241 with valve 130 which controls the vacuum-pump 5, whereby the speed of the said pump is increased or decreased in accordance with predetermined limits, so as to maintain the vacuum in the entire apparatus at the predetermined point. Inasmuch as such regulating devices are all well known and obtainable on the open market, it is deemed unnecessary to furnish a description thereof, as any device capable of effecting this result may be employed with equal efficacy.

The operation of the above described apparatus is substantially as follows:

Mixed vapors of water (steam) and trichloroethylene, or other solvent, rise from the treating drum 16 through the pipe 1 and T 21 into pipe 22, and become partially condensed so that by the time the mixed vapors reach the T 23 such liquid portions as already have condensed will flow down through the barometric leg 9 under the influence of gravity, collecting in the main 91, whence one or both liquids are transferred by the automatic pump 10 into the separating-tank 8. At the same time, uncondensed vapors pass upwardly, as shown by the arrow, through the T 23, into the vapor lines 24 and 24', and into the top of the condenser 2. Further condensation of the mixed vapors there takes place, the liquids running down through the T 3 and the barometric leg 9' into the aforesaid main 91.

Vapors still remaining uncondensed follow the path shown by the arrows, passing through the L or vapor separator 3', vapor line 25, and into the condenser 26 where a further condensation takes place. The interior of all of these parts of the apparatus are at less than atmospheric pressure. The liquids travel through the barometric leg 9'' and the line 92, into the collecting chamber 93. The float valve in chamber 93 is normally arranged so as to cause withdrawal of solvent through pump 10, and to prevent withdrawal of water which must pass through orifice 14 and pump 5, pipe 105, chamber 6 and pipe 106 into separation tank 8. It is contemplated, however, that with certain types of vacuum pumps it is possilbe to withdraw both solvent and water through pump 10, without, however, breaking the vacuum seal on pump 10. Any further uncondensed vapors then pass through the opening 41 and pipe 51 into the vacuum pump 5 where, passing through the internal mechanism of the pump, they emerge at the other side thereof, through line 105, at substantially or slightly above atmospheric pressure, entering the chamber 6 where any further condensed material flows to the bottom thereof and passes through pipe 106 into the collecting and stratifying tank 8. Any vapors which should still remain uncondensed will then pass into the condenser 7, and if still uncondensed will then pass through pipe 108 into the horizontal drum 12 which contains the silica-gel or other adsorbent and/or absorbent and which removes the final traces of solvent so that it may eventually be recovered by known means.

The pipe 22 is shown prolonged in the right-hand direction on the drawing with the interposed valve 22', this extension of the pipe leading to other coffee treating drums similar to drum 16 from which solvent is to be recovered.

The drum 16 itself is mounted so as to be rotatable about its axis, but no means for rotating the same are shown, as no claim per se is laid to the drum itself or its appurtenances except as hereinabove described and in the combination as claimed hereinbelow.

What I claim and desire to secure by Letters Patent of the United States is:

1. The process of decaffeinating green coffee beans which comprises subjecting the same to moisture in gradual increments and in an amount sufficient to dampen the beans but insufficient to dissolve any substantial amounts of solubles therefrom, thereupon subjecting the thus moistened beans to extraction with a volatile caffeine-solvent to remove the caffeine therefrom, withdrawing the bulk of the solvent and removing the balance of the latter by subjecting the beans to the action of water vapor, at a temperature not substantially above 170° F., until the solvent has been removed from the beans, and thereupon drying the same with dry warm air.

2. The process of decaffeinating green coffee beans which comprises subjecting the same to a fine spray or mist of water in gradual increments and in amounts sufficient to dampen the beans but insufficient to dissolve any substantial amounts of solubles therefrom, thereupon subjecting the thus moistened beans to extraction with trichloroethylene to remove the caffeine therefrom, withdrawing the bulk of the trichloroethylene and removing the balance of the latter by subjecting the beans to the action of water vapor at a temperature not substantially above 170° F. until the trichloroethylene has been removed from the beans, and thereupon drying the same with dry warm air, the entire operations being carried out within the same space and under continual moderate agitation.

3. In the process of decaffeinating green coffee beans the steps which comprise first destroying the enzymes, growth producing principles, and other substances capable of producing an "off" flavor of aroma in said beans by a heat treatment, followed by causing the thus treated beans to absorb moisture by spraying them with a fine mist of water, the addition of water being so gradual that the beans do not become sufficiently wet to cause appreciable solution of the water-soluble constituents therein contained.

4. In the process of decaffeinating green coffee beans the steps which comprise first destroying the enzymes, growth producing principles, and other substances capable of producing an "off" flavor and aroma in said beans by a short heat treatment, followed by causing the thus treated beans to absorb moisture by treatment with water vapor, the addition of water vapor being so gradual that the beans do not become sufficiently wet to cause appreciable solution of the water-soluble constituents therein contained.

5. The process of decaffeinating green coffee beans which comprises the steps of destroying the enzymes and growth producing principles in said beans by treating the same first under less than atmospheric pressure with water vapor at a temperature not exceeding 200° F. for a period from one to two hours and thereafter treating the same with water vapor at from 140° to 170° F. under a pressure that is lower than the pressure used during the first step.

6. The process of decaffeinating green coffee beans which comprises the steps of destroying the enzymes and growth producing principles in said beans by first treating the same with water vapor at a temperature between 150° and 200° F., followed by spraying said beans with water at a temperature not exceeding 170° F., the water being gradually added in such increments and in the form of a fine mist, so that at no time the beans become sensibly wet.

7. The process of conditioning green coffee beans for extraction of the caffeine therefrom which comprises tumbling the same while being subjected to a fine spray or mist of water added in such increments as to cause the beans to absorb said water without becoming sensibly wet.

8. The process of decaffeinating green coffee beans which comprises, (1) destroying the enzymes and other growth-producing principles in said beans by heat treatment, (2) adding moisture to said beans in such gradual increments that the beans do not become sensibly wet and that no substantial amount of soluble matter will be extracted therefrom, (3) extracting the caffeine from the thus treated coffee beans by means of a volatile solvent, (4) removing the bulk of said solvent, (5) removing the balance of said solvent by steam treatment of said beans while contained in less-than-atmospheric pressure surroundings and at a temperature not substantially above 170° F., and (6) drying said beans.

9. The process as defined in claim 8, in which step one (1) is carried out at less than atmospheric pressure and at a temperature not exceeding 200° F.

10. The process as defined in claim 8, in which step three (3) is effected by means of trichloroethylene.

HAROLD K. WILDER.